May 16, 1950  F. C. BINNALL ET AL  2,507,954
THERMOSTATIC MIXING VALVE
Filed Aug. 16, 1946  2 Sheets-Sheet 1
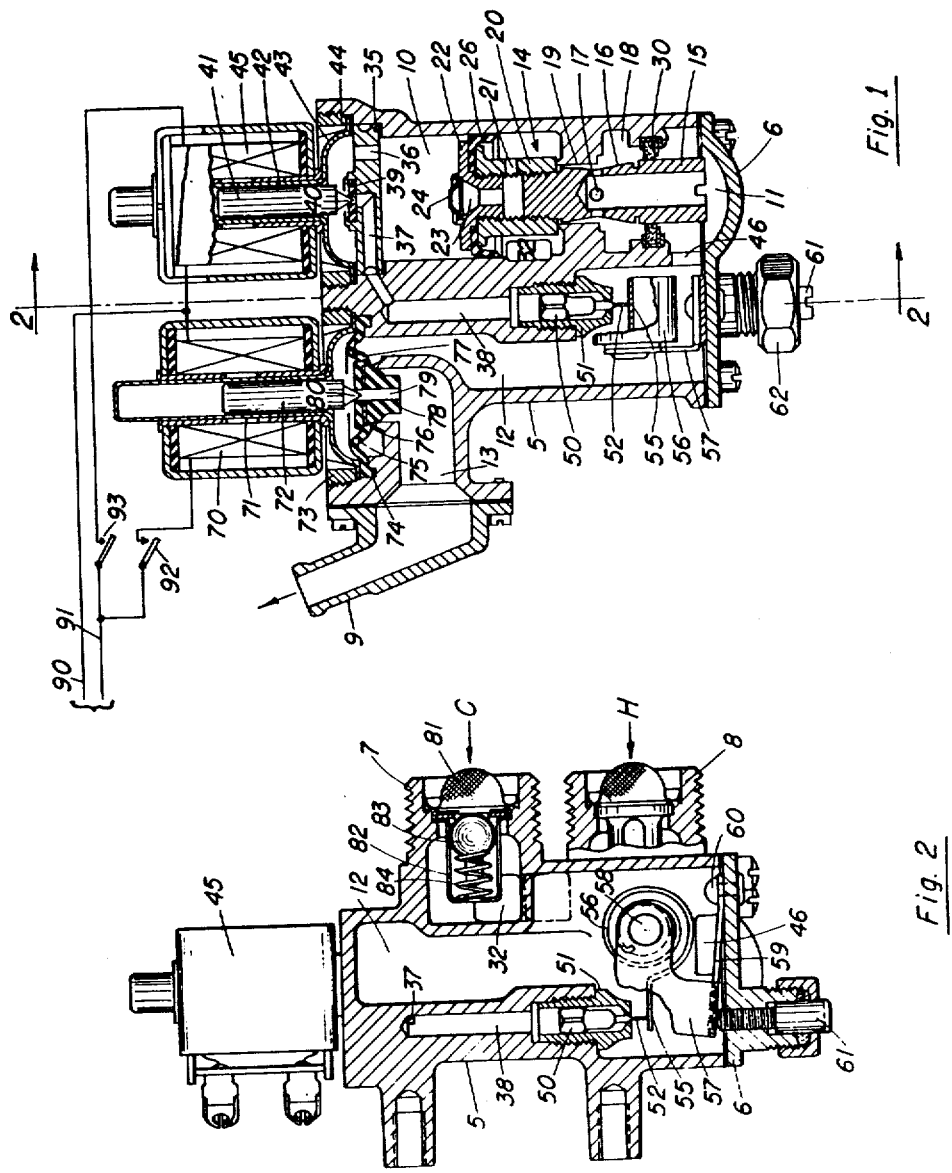
INVENTORS
FREDERICK C. BINNALL
BY MALCOLM T. MILLER
Parker & Carter
ATTORNEYS

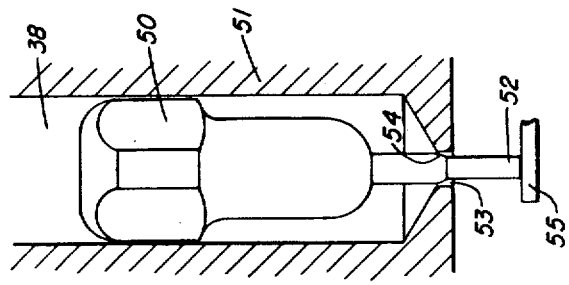
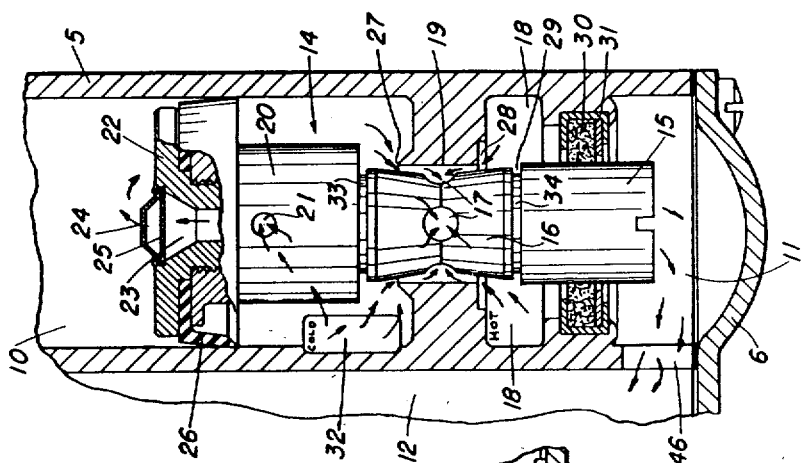
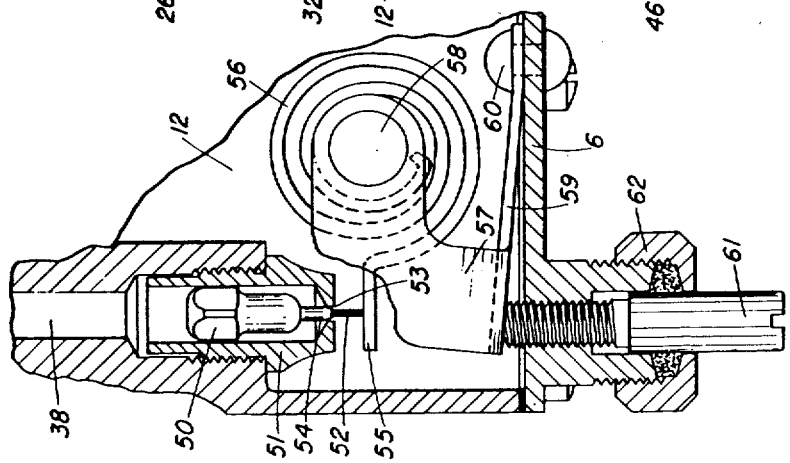

Patented May 16, 1950

2,507,954

UNITED STATES PATENT OFFICE 2,507,954

THERMOSTATIC MIXING VALVE

Frederick C. Binnall, River Forest, and Malcolm T. Miller, Oak Park, Ill., assignors to Sloan Valve Company, Chicago, Ill., a corporation of Illinois Application August 16, 1946, Serial No. 691,074

8 Claims. (Cl. 236—12)

The present invention relates in general to thermostatic mixing valves for controlling the temperature of a mixed outlet stream by regulating the mixing proportions of two liquid supplies, and the principal object is to provide a new and improved mixing valve of the foregoing type.

A further object is to provide a new and improved thermostatic mixing valve for mixing hot and cold liquids in which the flow of the mixed liquids at the outlet is maintained at substantially a predetermined temperature for which the valve is adjusted.

Another object of the invention is to provide a mixing valve for mixing hot and cold water which will not be affected by supply pressure differentials, supply pressure changes, and temperature changes when adjusted to provide mixed water of a given temperature.

A further object is to provide a mixing valve in which the admission of hot and cold water is brought about directly by the liquid supply pressure so that the thermostat is subjected to a minimum amount of work to cause operation of the valve.

Another object is to provide a mixing valve in which the valve member controlling the admission of hot and cold water is operated by one of the liquid supply pressures, and which valve member is controlled by a thermostatically operated pilot valve.

The foregoing and other objects and advantages not specifically mentioned are accomplished by the novel design, construction and combination of parts hereinafter described and shown in the accompanying drawings and specifically pointed out in the appended claims.

Referring to the drawings in which:

Fig. 1 is a cross-sectional view of a mixing valve constructed in accordance with a preferred embodiment of the invention;

Fig. 2 is a transverse sectional view taken along the line 2—2 of Fig. 1;

Fig. 3 is an enlarged sectional fragmentary view of the pilot valve and thermostat;

Fig. 4 is a fragmentary enlarged view of the piston valve shown in one of its operated positions; while Fig. 5 is an enlarged sectional view of the pilot valve in one of its operated positions.

The invention is illustrated in connection with a device for mixing hot and cold water to obtain a mixture of predetermined temperature for use in connection with the operation of automatic washing machines and the like, but it will be understood, however, that the present invention is equally applicable to the mixing of other desired liquids or for use in a shower bath or other place where it is necessary or desirable to hold the temperature of the mixed water within certain specified limits.

Referring more particularly to the drawings, Figs. 1, 2, and 4, the mixing valve comprises generally a casing 5 having a plurality of chambers therein and enclosed at the bottom end by a flat plate 6. Arranged on the side of the body 5 there are a pair of water inlet openings 7 and 8, the cold water supply being connected to the inlet 7 and the hot water supply to the inlet 8. An outlet 9 arranged on another side of the casing 5 is for the emission of the mixed or tempered water. The casing 5 is divided into several chambers of which the piston chamber 10 is arranged at one side of the casing, the mixing chamber 11 at the bottom of the casing, and a thermostat chamber 12 on the opposite side of the casing from the piston chamber 10. The outlet 9 of the valve is attached to the casing adjacent the outlet chamber 13. The upper side of the casing 5 is enclosed and accommodates a pair of solenoids to be hereinafter described.

Within the piston chamber 10 there is slidably arranged a mixing valve generally designated at 14. This mixing valve comprises a lower hollow valve member 15 having an intermediate tapered part 16 constituting the mixing valve proper. The part 16 has a series of circumferential openings 17 arranged therein communicating with the interior opening of the member 15 which is also open at the bottom end. At a point in the casing 5 surrounding the valve member 15 there is an inlet hot water chamber 18 having direct communication with the inlet supply 8. Separating the piston chamber 10 and the hot water inlet 18 is a restricted throat or passage 19 in the casing cooperating with part 16 and constituting the throttling portion of the mixing valve 14.

The valve 15 at its upper end threads into the interior threaded portion of the piston head 20, which is arranged with a by-pass opening 21 extending through the sides thereof. The piston 20 is provided with a headed portion 22 axially bored with a by-pass opening 23 which terminates at the upper end of the piston in a by-pass disc having a small by-pass opening 24 centrally located therein. To prevent entry of foreign matter which would plug up the by-pass opening 24, the screen 25 is provided. A piston packing member 26 is clamped to the head of the piston 20 by the member 22 and hydraulically separates the upper portion of the piston chamber 10 from the lower portion.

Referring now to the throttling throat 19 (Fig. 4) surrounding the part 16, its upper end provides a valve seat 27 which in the lowermost position of the piston head 20 closes off the cold water supply. At the bottom of the throat 19 a second seat 28 is provided, which is adapted to be contacted by the upper portion 29 of the valve 15 and close off the hot water supply. Surrounding the lower portion of the valve member 15 is a sealing member 30 preferably composed of felt, held in position by means of the U-shaped capsule 31. This seal serves to guide the lower end of the piston valve while providing a sliding seal therewith. This seal is also effective to prevent sticking of the piston valve by absorbing any lime or grit which may be in the water supply.

The upper and lower edge portions of the throttling part 16 of the piston are formed with annular grooves 33 and 34, see Fig. 4, the purpose of which is to reduce the throttling noises as the valve approaches its closed position against either seat 27 or 28, and to give minimum flow as the valve approaches the seats without extremely close fits between the valve part 16 and restricted throat 19.

The cold water supply from the inlet 7 passes through a passage 32 in the casing 5 and extends into the piston chamber 10 below the piston packing member 26.

The upper end of the piston chamber 10 is closed off by a disc member 35 resting in a recess cut in the body 5. It is provided with a circumferential groove and a passage 36 extending from the top of the piston chamber 10, and a second passage 37 extending laterally from a central point in the disc 35 to the circumferential groove, providing access to the pilot valve passage 38. The end of passage 37 terminates in a valve seat 39, as shown, which is closed off in the normal position by the pointed end 40 of the solenoid plunger 41. The solenoid comprises a sleeve 42 arranged axially above the disc 35 and in which the plunger 41 is slidable vertically. At its lower end, the sleeve 42 is provided with a flared disc 43 which is clamped directly over the disc 35 by the clamping ring 44 threaded into the top of the casing 5. A suitable solenoid winding 45 surrounds the plunger 41 and sleeve 42, which upon being energized withdraws the pointed end 40 of plunger 41 to permit free passage of liquid between the upper piston chamber 10 and passage 37.

The mixing chamber 11 at the bottom of sleeve member 15 is provided with an outlet 46 which communicates with the thermostat chamber 12. Within chamber 12 there is arranged a pilot valve member 50, held in position at the lower end of passage 38 by the capsule member 51 threaded in the lower opening of passage 38. Pilot valve 50 at its lower end has a guiding stem 52 passing through the throttle opening 53 in the end of capsule casing 51. The pilot valve 50 is also provided, in operative relation with throttle opening 53, with a section of its stem 54 which is so curved and proportioned as to constitute a parabolic throttle seat with the opening 53 to obtain a constant ratio value. A flattened movable end 55 of a bimetal thermostat 56 is arranged in direct engagement with the lower end of stem 52 of the pilot valve 50 and movement of the bimetal thermostat serves to variably move seat portion 54 of the pilot valve through the throttle opening 53 in accordance with temperature variations to which the thermostat 56 responds.

The thermostat 56 is supported within the thermostat chamber 12 by an angular bracket, having an upright portion 57 to which a pin 58 is rigidly attached. The inner end of bimetal thermostat 56 is crimped and clamped to the pin 58 as shown. A lower flat portion 59 of the bracket 57 is bent at right angles thereto and anchored as by rivets 60 to the bottom closing plate 6. In order to provide an adjustable setting for the thermostat 56, an adjusting screw 61 extending to the exterior of the mixing valve casing and readily accessible, has one end in abutting engagement with the bottom of bracket 57. A suitable packing nut 62 prevents leakage around the adusting screw 61.

Referring now more specifically to Fig. 1, the outlet end of the thermostat chamber 12 is provided with shut-off means controlled by solenoid 70, which is constructed in a similar manner to solenoid 45 and includes a sleeve member 71, having a reciprocal plunger 72 vertically slidable therein and which sleeve also has a flared portion arranged in the opening on top of the mixing valve casing. The flared end of the sleeve 71 is clamped in position by the clamping ring 73 threaded into the casing 5. A flexible diaphragm 75 normally rests on the shut-off seat 76 and thereby closes off the outlet chamber 13 when the valve is seated. This diaphragm 75 is provided with a small by-pass opening 77 permitting entry of liquid pressure from the outlet end of thermostat chamber 12 to the upper side of the diaphragm 75, so that this pressure having effect on the greater area on top of the diaphragm than the bottom, will hold the diaphragm 75 tight on its seat 76. The lower portion of the diaphragm 75 has a protruding guide or throttle member 78 extending into the outlet chamber 13, for the purpose of assisting in guiding the valve to its seat and also to prevent chatter in the closing position. The guide member 78 is provided with a central bore 79 extending through the diaphragm 75 and has a reinforcing member imbedded therein. This opening 79 is normally closed by the pointed end 80 of the solenoid plunger 72, and it will be obvious that when the plunger 72 is raised, the pressure on the upper portion of the diaphragm 75 holding it tightly against the seat 76, is relieved through the passage 79, permitting opening of the diaphragm from its seat by pressure below the diaphragm.

Both the cold water inlet 7 and the hot water inlet 8 are provided with screens 81 to prevent entry of foreign matter into the valve, and also a check valve which comprises a cage member 82 having a ball valve member 83 confined therein, normally spring-pressed into closed or seated position by the light spring 84.

The thermostatic mixing device heretofore described in one of its adaptations is particularly applicable for use in automatic washing machines, that is, machines which successively perform a predetermined program of washing and rinsing steps without manual attention. When used in this form, the inlet ports 7 and 8 are suitably connected to sources of hot and cold water and the discharge port 9 is connected to the cylinder of the washing machine. The switches 92 and 93 which control the operation of solenoids 45 and 70 connect with a source of commercial current over wires 90 and 91. These switches 92 and 93 are opened and closed in a predetermined sequence by any manual or automatic timing mechanism, not shown.

The use and operation of the present invention is as follows: Assume that there is a supply of hot water connected to the inlet 8 and cold water to the inlet 7, and that both solenoids are in their normal de-energized positions. Under these conditions the higher of the two line pressures is exerted throughout the valve passages to the diaphragm shut-off valve 75 which is held on its seat by this pressure. Back-flow into the other inlet line is prevented by the check valve.

In the normal washing cycle, water is required at various times under two different conditions: (1) hot water uncontrolled as to temperature, and (2) tempered water at a predetermined temperature. The first condition (1) is obtained with hot water direct from outlet 9 and this is accomplished by electrical switch 92 being closed to energize shut-off solenoid 70 from the electrical current supply over wires 90 and 91. As a result, solenoid plunger 72 is raised upward to open its seat 80 and relieve the water pressure above the diaphragm 75 through opening 79 therein. The line pressure is thereby effective to lift and flex the diaphragm 75 upward from its seat 76 and fully open the valve.

Since solenoid plunger 41 is still on its seat, one or the other of two actions will occur:

(a) As hot water starts to flow, the pressure in mixing chamber 11 will drop below the cold water supply pressure in chamber 10 above piston 20, causing a differential pressure across piston valve 14, moving it downward to its seat 27 and causing a flow of hot water at outlet 9 uncontrolled as to temperature, or (b) As hot water starts to flow, the pressure in mixing chamber 11 will remain as high or higher than the cold water supply pressure to chamber 10. For this condition to occur, the hot water pressure in inlet 18 must be higher than the pressure in chamber 11 and this higher pressure will be transmitted through passage 19 to chamber 10, causing a differential pressure across piston valve 14, moving it downward to its seat, causing a flow of hot water uncontrolled as to temperature. Back flow of the hot water into the cold water line is prevented by the check valve.

After sufficient water has been supplied, the switch 92 is opened thereby de-energizing the solenoid 70 and causing the diaphragm 75 to close on its seat 76 and shut off the water flow.

The second condition (water at a predetermined temperature) is obtained by energizing both solenoids 45 and 70 through switches 93 and 92, thus raising solenoid plunger 46 from its seat and opening the passageway between piston chamber 10 and pilot valve passage 38, and raising solenoid plunger 72 from its seat, causing opening of diaphragm shut-off valve 75 as previously described. A flow of water then occurs. The thermostat 56 acts to raise or lower pilot valve 50, depending on whether the temperature at the thermostat is above or below the predetermined temperature for which the thermostat is set. If the temperature is above the adjusted temperature, the thermostat will raise pilot valve 50, increasing the size of the throttle opening 53, thereby reducing the pressure above the piston in chamber 10 and causing an unbalance of forces on piston 14 which moves it upward. This action of piston 14 increases the cold water opening at seat 27 and decreases the hot water opening at seat 28 due to the tapered construction at part 16. The flow of cold water will therefore be increased and the flow of hot water decreased and the temperature of the mixture will decrease. Piston 14 will continue to move upwards until the temperature at the thermostat has reached the adjusted temperature at which time the thermostat will have lowered pilot valve 50 to the point where a balanced condition is maintained on the piston 14.

If the temperature at the thermostat is below its set temperature, it will lower pilot valve 50, decreasing the throttle opening 53, thereby raising the pressure above the piston in chamber 10 and causing an unbalance of forces on piston 14 which move it downward, decreasing the flow of cold water and increasing the flow of hot water and thus raising the temperature of the mixed water at the thermostat. The piston 14 will continue to move downward until the adjusted temperature has been reached at which time the thermostat will have raised pilot valve 50 to the point where a balanced condition is maintained on the piston 14.

The mixing of the hot and cold water takes place in a manner illustrated in Fig. 4 which indicates the position of piston 14 for equal supply pressures when equal proportions of hot and cold water are admitted to the mixing chamber. As indicated by the arrows, the cold water is received in chamber 10 from inlet 32, flows through the variable restriction formed by seat 27 and through the series of openings 17 around the tapered part 16. The hot water is received in chamber 18, passes through the variable restriction formed by seat 28, and through the openings 17 at which place the hot and cold waters are intermingled. As the flow passes through the hollow valve 15 and downward into the mixing chamber 11, it is thoroughly mixed.

Referring specifically to Fig. 5, it will be noted that pilot valve 50 has a throttling portion 54 formed on stem 52 which cooperates with orifice 53 to control the free area of passage through orifice 53. Portion 54 of valve 50 is so constructed that equal increments of movement produce approximately equal proportions of free area change regardless of the position of the valve 50 in its operating stroke. This construction is used so that the response of piston 14 to movement of valve 50 will be the same throughout the operating stroke of valve 50.

It will be appreciated that with the arrangement of the invention disclosed the thermostatic element 56 is only required to move valve 50 with only a small amount of power and a short stroke, the main piston 14 being operated hydraulically. In this way no large stresses or strains are placed upon the thermostatic element.

It is to be understood that in the present embodiment of the invention the hot and cold water inlets may be reversed and the operation of the thermostatic element reversed and the valve will operate equally well.

While only a single embodiment of the invention has been illustrated and described in detail, it will be understood that many changes might be made therein, and it is therefore not intended to limit the invention to the form shown and described, but only to the scope and terms of the appended claims.

What is claimed is:

1. In a mixing valve, a casing having inlets for fluids of different temperatures, a mixing chamber in said casing, a valve seat in said casing around a port leading to said mixing chamber, a piston having a valve seating portion co-operating with said valve seat for controlling one of said inlets, a thermostat in said mixing chamber acted upon by the combined fluids from said inlets, a pilot valve operated by said thermostat, and a passage leading to said mixing chamber from one side of said piston, the pressure of one of said inlets being exerted on the side of said piston to which the passage leads, said passage being controlled by said pilot valve to relieve the pressure on the one side of said piston, and means for exerting the pressure of the other one of said inlets on the other side of said piston to open the valve seat to cause movement of the piston when the pilot valve is operated and a depending hollow sleeve on said piston having inwardly tapered sides with liquid inlet ports formed at the narrowest portion thereof leading into said sleeve for passing the liquid into said mixing chamber, said tapered sleeve portion providing a throttling action in cooperation with said valve seat for the liquid flow.

2. In a thermostatic mixing valve comprising a casing having hot and cold liquid inlet supplies, a mixing chamber in said casing having an outlet for the tempered liquid, and a piston valve assembly in said casing for controlling the admission of said liquid supplies into said mixing chamber, said piston valve assembly comprising a piston head having a packing seal thereon for dividing the piston chamber into two parts, a by-pass extending through said piston head from one side of said packing seal to the other side, a valve member attached to said piston head and comprising a tube open at one end extending into the mixing chamber and having openings for supplying proportional amounts of hot and cold liquids into said mixing chamber, and a valve seating portion on said piston head for shutting off the liquid flow from one of said inlet supplies.

3. In a thermostatic mixing valve comprising a casing having two liquid inlets and an outlet, a mixing chamber in said casing, a valve seat in said casing around a port leading to said mixing chamber, a piston having a valve seating portion cooperating with said valve seat for controlling the admission of liquid from one of said inlets to said mixing chamber, a thermostat in the path of said mixed liquids, a by-pass for supplying liquid pressure to one side of said piston directly from one of said inlets tending to move the piston and its valve seating portion towards its seat to reduce the liquid flow from the said one inlet, the other of said inlets having normal unrestricted flow into said mixing chamber, a pilot valve controlled by said thermostat for reducing the liquid pressure on the said piston to cause the piston to move its seating portion away from its seat and admit proportional amounts of liquid from said inlets to said mixing chamber and a depending hollow sleeve on said piston having inwardly tapered sides with liquid inlet ports formed at the narrowest portion thereof leading into said sleeve for passing the liquid into said mixing chamber, said tapered sleeve portion providing a throttling action in cooperation with said valve seat for the liquid flow.

4. In a thermostatic mixing valve comprising a casing having hot and cold liquid supply inlets and an outlet, a mixing chamber in said casing, a valve seat in said casing around a port leading to said mixing chamber, a piston including a piston head and a valve seating portion attached thereto cooperating with said valve seat for controlling the admission of liquid from one of the hot and cold supply inlets to said mixing chamber, a a thermostat adjacent the outlet of said mixing chamber, a by-pass in said piston head for supplying the liquid pressure from the cold supply inlet to one side of said piston head, said liquid pressure effective to move said piston head and cause said valve seat to be closed to shut off the liquid flow from one of the supply inlets to the mixing chamber, and a pilot valve controlled by said thermostat for relieving the liquid pressure on said piston head to permit the piston head to move said valve seating portion and admit proportional amounts of hot and cold liquid to said mixing chamber in accordance with the movement of said valve seating portion and a depending hollow sleeve on said piston having inwardly tapered sides with liquid inlet ports formed at the narrowest portion thereof leading into said sleeve for passing the liquid into said mixing chamber, said tapered sleeve portion providing a throttling action in cooperation with said valve seat for the liquid flow.

5. A piston control valve for a thermostatic mixing valve comprising a piston head having a packing member arranged on one end and a valve seating portion on the other end, a sleeve member extending axially from the lower end of said piston head concentric with said valve seating portion, said sleeve member comprising a hollow tube open at its lower end and having an intermediate tapered throttle portion with liquid inlets arranged in its sides for passing liquid into the hollow tube to mix the fluid therein, and a liquid by-pass extending through said piston head.

6. A piston control valve member for a thermostatic mixing valve comprising a piston head having a packing member arranged at its upper end and a valve seating portion at the lower end, a hollow sleeve valve extending from the lower end of said piston head having an intermediate throttle portion and being open at the bottom end, and a liquid by-pass arranged on the upper end of said piston head, said elements all being arranged in axial alignment with one another, said intermediate throttle portion being tapered and having fluid inlets in the sides leading into the hollow portion of said sleeve member to mix the fluids therein.

7. In a valve construction for controlling the flow of fluids, a movable valve member having a piston head on one end and a hollow sleeve member on the opposite end, an intermediate tapered valve part between said piston head and said sleeve member, there being a fluid passage through said sleeve member from said tapered valve part to the lower end of said sleeve member, and a sealing member surrounding said sleeve member to guide the movements of said sleeve member and confine the liquid flow through the sleeve member passage only.

8. In a thermostatic mixing valve, a casing having a piston chamber and a mixing chamber therein, a piston valve having a piston head slidably arranged in said piston chamber and a sleeve member extending in said mixing chamber, a throttle throat formed in said casing and connecting said chambers, a tapered valve portion arranged in said throttle throat connecting said piston head with said sleeve member, an inlet liquid supply source on one side of said throttle throat and a second liquid supply source on the other side of said throttle throat, and means in said sleeve member for mixing said liquid supplies and passing them into said mixing chamber.

FREDERICK C. BINNALL.
MALCOLM T. MILLER.

REFERENCES CITED

The following references are of record in the file of this patent:

UNITED STATES PATENTS

| Number | Name | Date |
|---|---|---|
| 390,960 | Gustin | Oct. 9, 1888 |
| 1,195,722 | Powers | Aug. 22, 1916 |
| 1,819,045 | Snediker | Aug. 18, 1931 |
| 2,214,148 | Scott | Sept. 10, 1940 |
| 2,320,905 | Bateholts | June 1, 1943 |
| 2,394,345 | Werner | Feb. 6, 1946 |

FOREIGN PATENTS

| Number | Country | Date |
|---|---|---|
| 818,042 | France | Sept. 16, 1937 |